(12) United States Patent
Liu

(10) Patent No.: US 6,382,541 B1
(45) Date of Patent: May 7, 2002

(54) WINDER OF FISHING ROD

(76) Inventor: Hsi Hung Liu, 6F-9, No. 2, Lane 172, Sec.3, Ching Hai Rd., Taichung (TW)

( * ) Notice: Subject to any disclaimer, the term of this patent is extended or adjusted under 35 U.S.C. 154(b) by 0 days.

(21) Appl. No.: 09/634,292

(22) Filed: Aug. 9, 2000

(30) Foreign Application Priority Data

Aug. 20, 1999 (TW) .......................................... 88214188

(51) Int. Cl.$^7$ .............................................. A01K 89/01
(52) U.S. Cl. ........................ 242/241; 242/249; 242/279
(58) Field of Search ................................. 242/241, 249, 242/273, 274, 278, 279, 277

(56) References Cited

U.S. PATENT DOCUMENTS

| | | | | |
|---|---|---|---|---|
| 3,437,282 A | * | 4/1969 | Honkonen et al. | 242/241 |
| 4,892,267 A | * | 1/1990 | Webb | 242/241 |
| 5,415,358 A | * | 5/1995 | Yamaguchi | 242/241 |
| 5,662,285 A | * | 9/1997 | Hashimoto | 242/241 |
| 5,683,047 A | * | 11/1997 | Ohtake | 242/241 |
| 5,775,612 A | * | 7/1998 | Hashimoto | 242/241 |
| 5,775,614 A | * | 7/1998 | Yamaguchi | 242/279 |
| 5,934,586 A | * | 8/1999 | Kang et al. | 242/241 |
| 5,934,589 A | * | 8/1999 | Young | 242/249 |
| 5,988,546 A | * | 11/1999 | Young | 242/241 |
| 6,059,211 A | * | 5/2000 | Young | 242/241 |
| 6,179,236 B1 | * | 1/2001 | Jang | 242/273 |

FOREIGN PATENT DOCUMENTS

| | | | | |
|---|---|---|---|---|
| FR | 1299923 | * | 6/1962 | 242/241 |

* cited by examiner

*Primary Examiner*—Emmanuel M. Marcelo
(74) *Attorney, Agent, or Firm*—Rosenberg, Klein & Lee

(57) ABSTRACT

A winder of fishing rod, including a housing, a reel unit and a linking mechanism. A sleeve of the linking mechanism is fitted with a mandrel of the reel unit which is drivingly connected with the reel. An engaging member of the sleeve is reciprocally movable within the travel grooves of the mandrel. The entire sleeve can share the force exerted onto the mandrel so as to ensure the engagement between the engaging member of the sleeve and the travel grooves. Therefore, the engaging member is guided by the sleeve to smoothly move and make the fishing line evenly wound on the reel unit.

4 Claims, 7 Drawing Sheets

WINDER OF FISHING ROD

BACKGROUND OF THE INVENTION

The present invention relates to a winder of fishing rod, and more particularly to a winder of fishing rod, in which the reel unit is stably located and the fishing line can be evenly wound on the reel.

FIGS. 7 to 9 show a conventional winder of fishing rod. The top end of the housing 8 of the winder is disposed with a reel unit 89. A linking mechanism 82 is disposed in the housing 8. The linking mechanism 82 includes a crank 83 drivingly engaged with a first gear 84 which is engaged with a second gear 85. The second gear 85 is formed with a slot 851 in which a linking block 86 is positioned. The linking block 86 has a projection 861 inserted in a travel groove 871 of a rocking block 87. The rocking block 87 is fixed with a mandrel 88. By means of rotating the crank 83, the first and second gears 84, 85 are driven to make the projection 861 of the linking block 86 slide within the travel groove 871 of the rocking block 87. Accordingly, the reel 891 of the reel unit 89 drivingly connected with the mandrel 88 is reciprocally moved up and down so as to wind the fishing line on the reel 891.

However, such winder is operated by means of simple harmonic movement. At the upper and lower dead ends of the travel groove 871 of the rocking block 87 and the second gear 85, the operation consumes longer time than other positions. Therefore, more loops of fishing line is wound on the top and bottom ends of the reel 891 so that the fishing line can be hardly evenly wound on the reel 891. This affects the using effect of the fishing rod.

Moreover, when used with a longer reel 891, the up and down reciprocating travel of the mandrel 88 must be enlarged. However, the second gear 85 is positioned in the housing 8 and the second gear 85 must be enlarged to elongate the travel of the rocking block 87. This leads to increment of the volume of the housing 8. Accordingly, the length of the reel 891 is quite limited and is not applicable to a large-size winder.

FIGS. 10 and 11 show a second type of existent winder of fishing rod which is disclosed in U.S. Pat. No. 5,941,470. A reel unit 91 and a linking mechanism 92 are disposed in the housing 9 of such winder. The linking mechanism 92 includes a crank 921 drivingly coupled with a gear 93. The gear 93 meshes with a spiral rod 94 fixed with a mandrel 95. The outer circumference of the mandrel 95 is formed with travel grooves 951 which are interlaced in reverse directions. A projection 961 of a slide block 96 is inserted in the travel grooves 951. The other side of the projection 961 is drivingly connected with the reel unit 91, whereby the reel 911 of the reel unit 91 can be up and down reciprocally moved to wind the fishing line on the reel 911.

The slide block 96 is movable along the travel grooves 951 of the mandrel 95 to make the fishing line evenly wound on the reel 911. However, only the projection 961 of the slide block 96 contacts with the travel grooves 951 and the entire reel unit 91 is driven thereby. When wound, the fishing line will exert a drawing force onto the reel 911. Therefore, as shown in FIG. 11, the reel unit 91 often swings due to insufficient supporting force or even clogs due to severe swinging. This makes it impossible to further use the fishing rod.

Furthermore, when it is necessary to use a longer reel 911, the up and down reciprocating travel of the mandrel 95 must be enlarged. Under such circumstance, the reel unit 91 will even more severely swing.

SUMMARY OF THE INVENTION

It is therefore a primary object of the present invention to provide a winder of fishing rod in which the sleeve of the linking mechanism is fitted with the mandrel drivingly coupled with the reel and an engaging member of the sleeve is reciprocally movable within the travel grooves of the mandrel. Therefore, the entire sleeve will share the force applied to the mandrel to make the reel unit stably located without swinging and ensure the engagement between the engaging member of the sleeve and the travel grooves of the mandrel. The engaging member is guided by the sleeve to smoothly move and make the fishing line evenly wound on the reel unit.

It is a further object of the present invention to provide the above winder of fishing rod, which can easily change the reciprocating travel of the reel.

The present invention can be best understood through the following description and accompanying drawings wherein:

DETAILED DESCRIPTION OF THE PREFERRED EMBODIMENT

Figure 1:
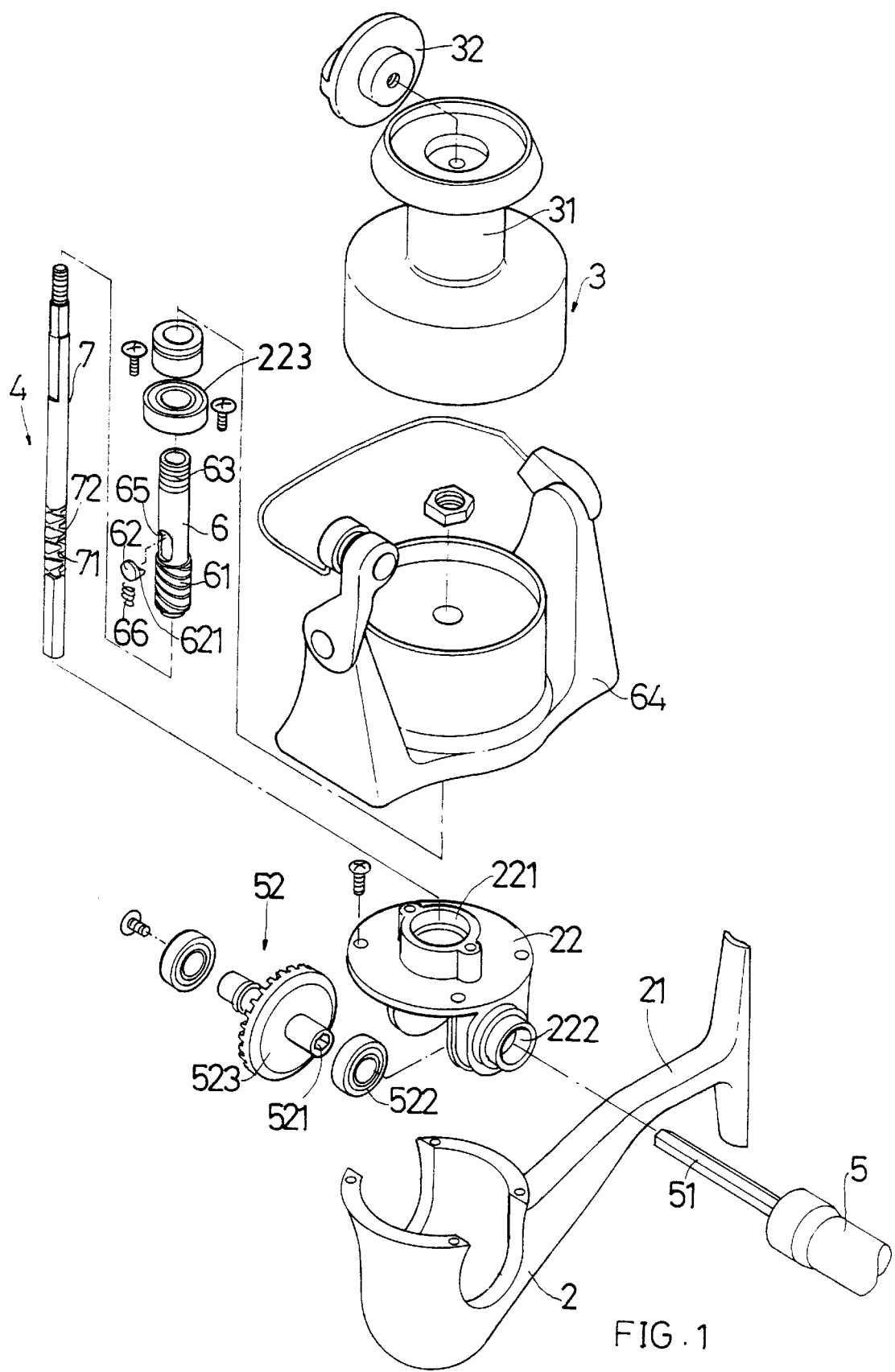
FIG. 1 is a perspective exploded view of the present invention.
Figure 2:
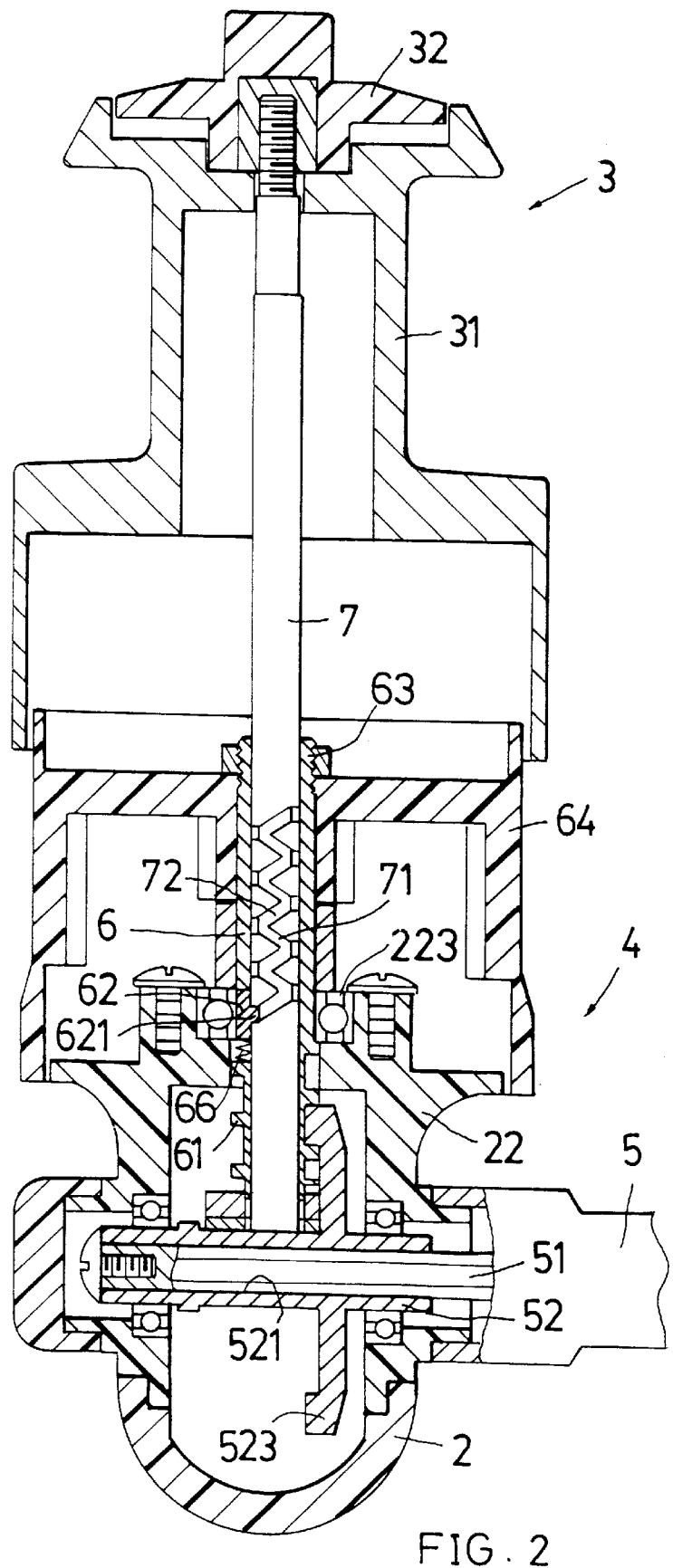
FIG. 2 is a sectional assembled view of the present invention, showing that the sleeve of the linking mechanism is positioned at the bottom of the travel groove of the mandrel.

Please refer to FIGS. 1 to 6. The winder of the fishing rod of the present invention includes:

a housing 2 having an upward opening, the housing 2 having a grip 21 on one side for a user to hold, a bearing seat 22 being disposed on top section of the housing 2, the bearing seat 22 being formed with a central axial hole 221 in which a bearing 223 is positioned, two sides of the bearing seat 22 being respectively formed with two transverse holes 222;

a reel unit 3 disposed at top section of the housing 2 and having an axial line reel 31 at middle section, the line reel 31 having smaller outer diameter, a cover body 32 being disposed on top section of the reel unit 3; and a linking mechanism 4 disposed in the housing 2 and including a crank 5, a sleeve 6 and a mandrel 7.

One end of the crank 5 is disposed with a hexagonal shaft 51 inserted in a hexagonal hole 521 of a gear member 52, two ends of the gear member 52 being fitted with two bearings 522 and extending through the transverse holes 222 of the bearing seat 22, a middle section of the gear member 52 is disposed with a gear 523.

The sleeve 6 has a spiral rod section 61 engaged with the gear 523. A middle section of the sleeve 6 is formed with an elliptic hole 65. An engaging member 62 is positioned in the elliptic hole 65 within the bearing 223. A spring 66 is disposed under the engaging member 62. A bolt section 63 is formed at top end of the sleeve 6 for fixing a line winding rack 64 disposed between the housing 2 and the reel unit 3. The line winding rack 64 is rotatable along with the sleeve 6.

The outer circumference of the mandrel 7 is formed with first and second travel grooves 71, 72 which are interlaced with each other in reverse directions. The top and bottom ends of the first and second travel grooves 71, 72 communicate with each other. The mandrel 7 is fitted in the sleeve 6 and passed through the axial hole 221 of the bearing seat 22 and the line winding rack 64. A projection 621 of the engaging member 62 is engaged in the first and second travel grooves 71, 72 of the mandrel 7. The reel 31 is fitted with the top section of the mandrel 7. The top end of the mandrel 7 is bolted with the cover body 32 of the reel unit 3.

Figure 4:
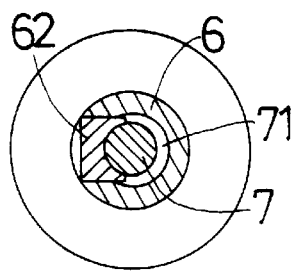
FIG. 4 is a cross-sectional view showing that the engaging member of the sleeve of the present invention is engaged in the travel groove of the mandrel.
Figure 3:
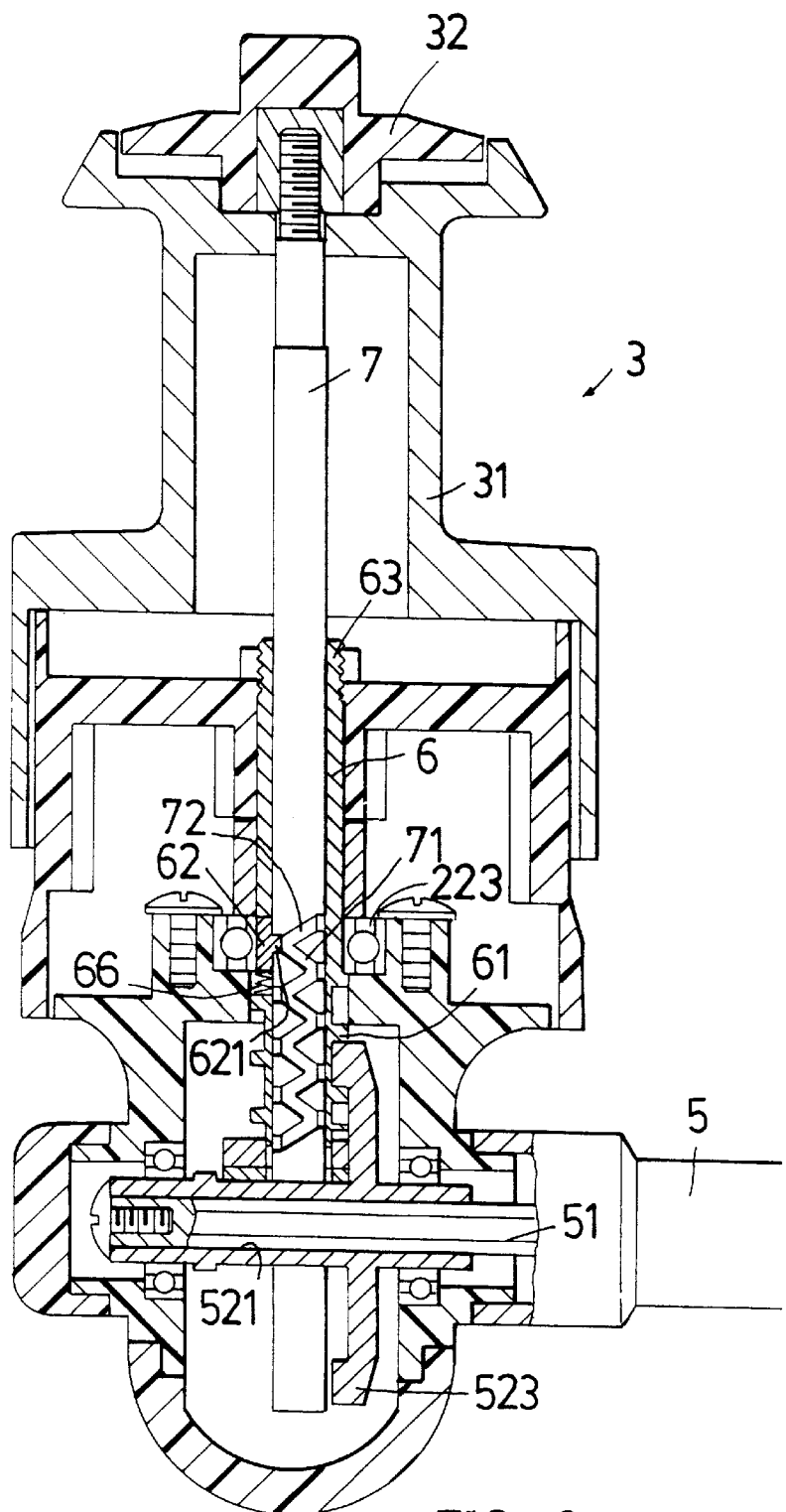
FIG. 3 is a sectional assembled view of the present invention, showing that the sleeve of the linking mechanism is positioned at the top of the travel groove of the mandrel.
Figure 6:
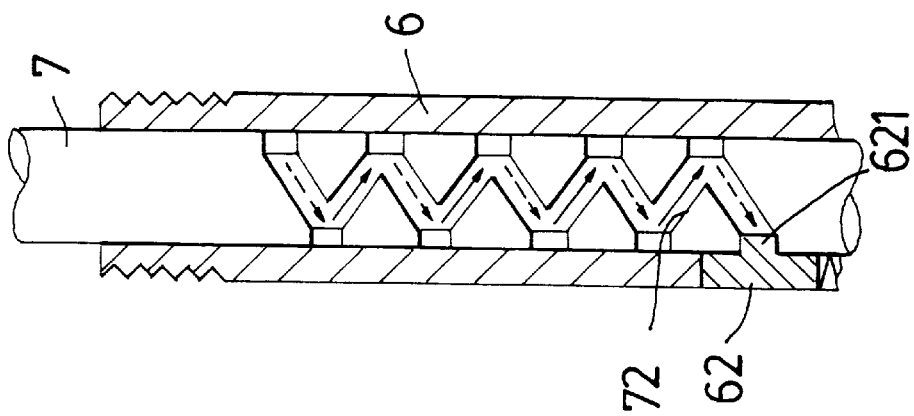
FIG. 6 is a sectional view showing the path of the engaging member of the sleeve of the present invention in the second travel groove of the mandrel.
Figure 5:
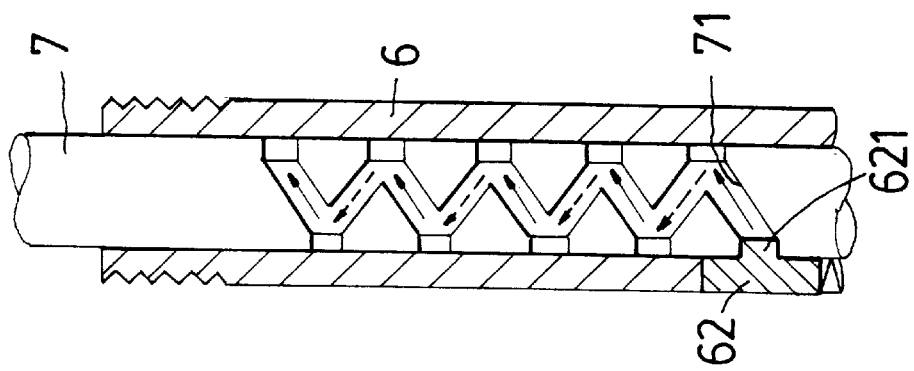
FIG. 5 is a sectional view showing the path of the engaging member of the sleeve of the present invention in the first travel groove of the mandrel.
Figure 9:
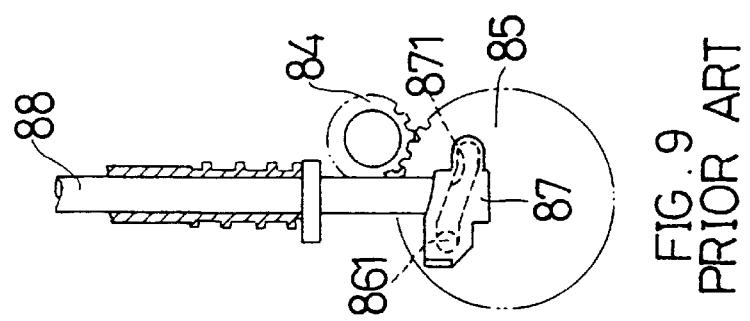
FIG. 9 shows the operation of the linking mechanism of the conventional winder in another state.
Figure 8:
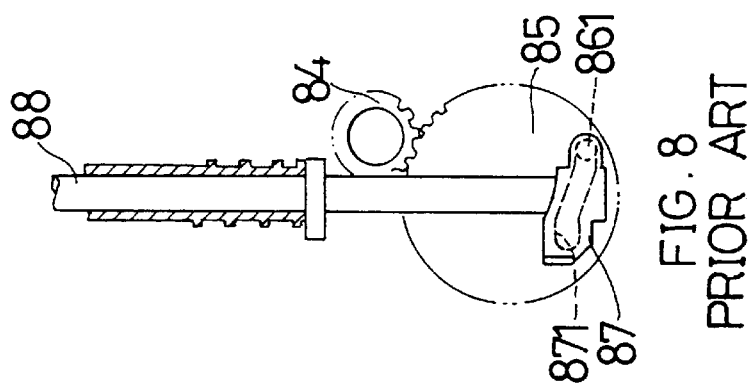
FIG. 8 shows the operation of the linking mechanism of the conventional winder in one state.
Figure 7:
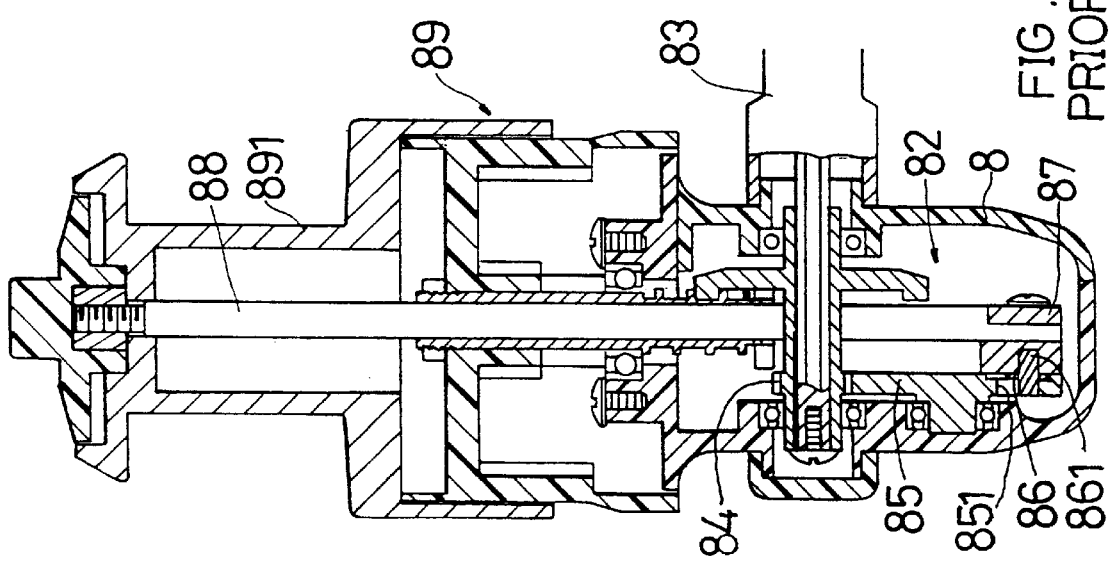
FIG. 7 is a sectional assembled view of a conventional winder of fishing rod.
Figure 10:
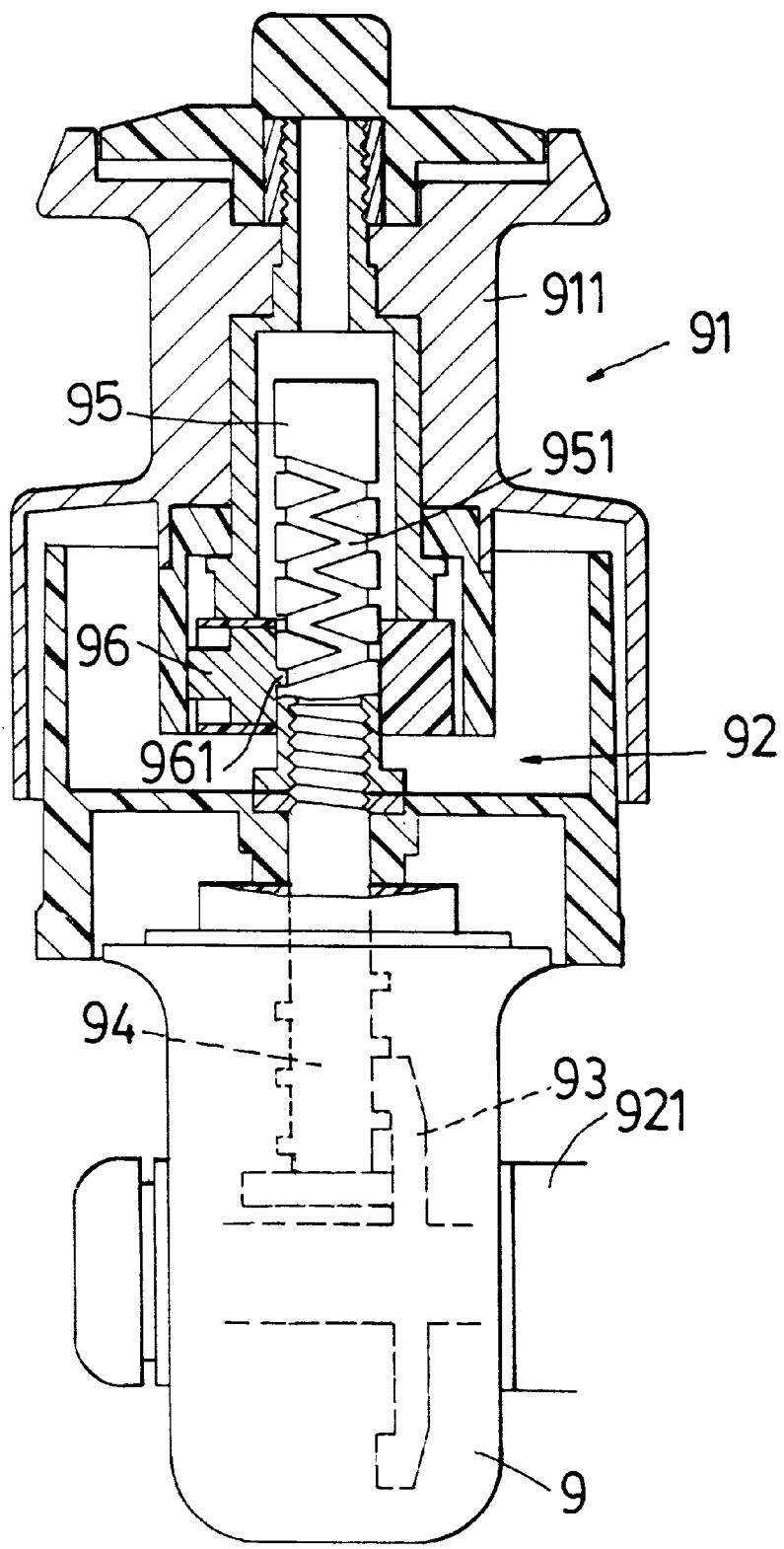
FIG. 10 is a sectional assembled view of another conventional winder of fishing rod.
Figure 11:
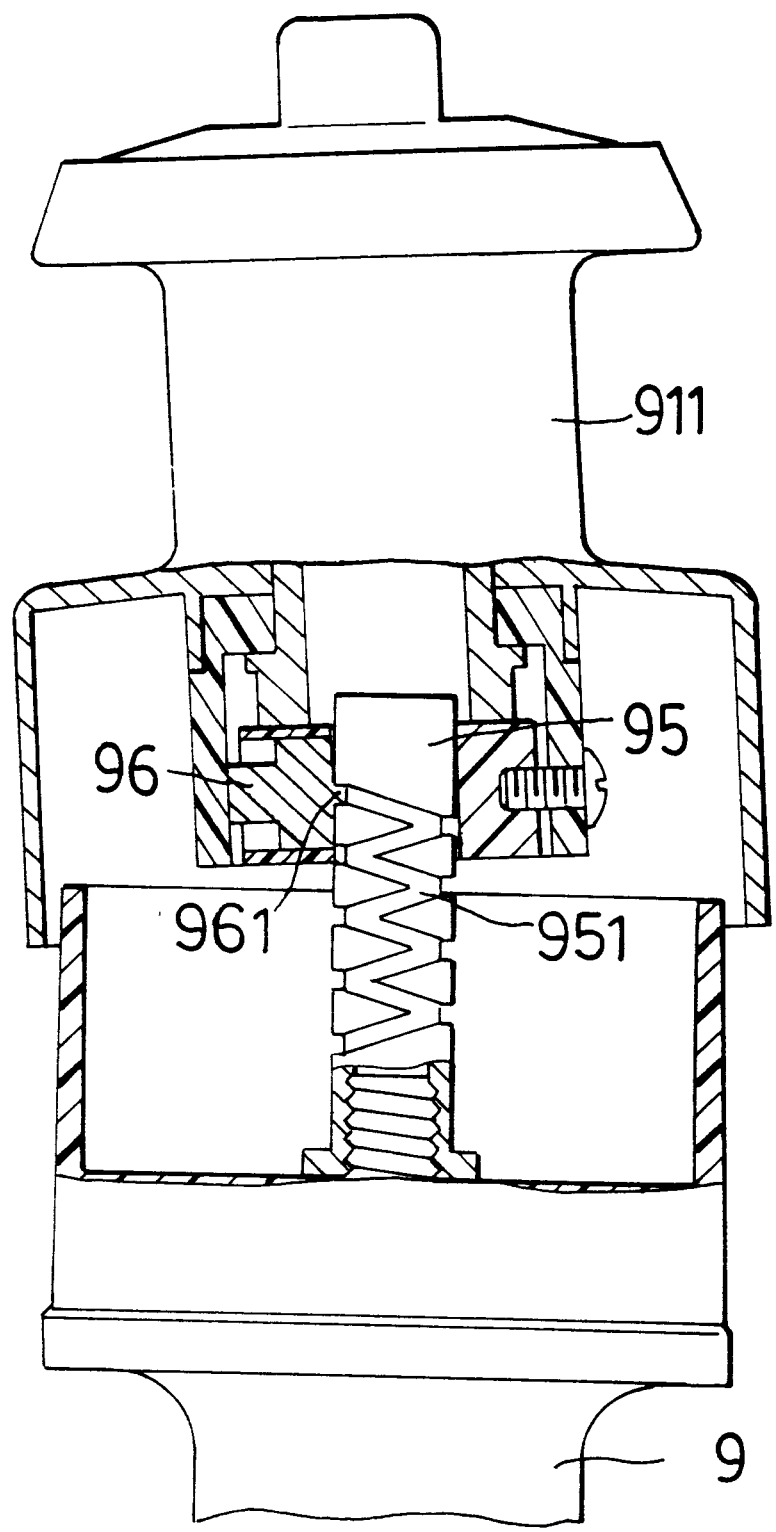
FIG. 11 shows that the reel unit of the winder of FIG. 10 swings when winding the fishing line.

The projection 621 of the engaging member 62 of the sleeve 6 is movable within the first and second travel grooves 71, 72 of the mandrel 7. Accordingly, when the sleeve 6 drives the reel unit 3 to rotate, the mandrel 7 will reciprocally move up and down. As shown in FIGS. 4 and 5, the engaging member 62 moves upward along the first travel groove 71 to the top end thereof. Furthermore, as shown in FIG. 6, the engaging member 62 moves downward along the second travel groove 72 to the bottom end thereof. At this time, the spring 66 pushes the engaging member 62 to provide a buffering effect. Therefore, the mandrel 7 drives the reel 31 of the reel unit 3 to reciprocally move up and down. Moreover, the spiral rod section 61 of the sleeve 6 is engaged with the gear 523 so that when rotating the crank 5, the line winding rack 64 is simultaneously drivingly rotated and the reel unit 3 is reciprocally moved up and down. Therefore, the fishing line is evenly wound on the reel unit 3.

The engaging member 62 of the sleeve 6 is reciprocally movable within the first and second travel grooves 71, 72 of the mandrel 7 so that the fishing line can be evenly wound on the reel unit 3. In addition, the entire sleeve 6 is fitted with the mandrel 7 so that the entire sleeve 6 can share the force applied to the mandrel 7. Also, the spring 66 first partially offsets the impact force so as to ensure that the sleeve 6 will not suffer a great impact force. The bearing 223 of the bearing seat 22 restricts the engaging member 62 to keep engaging with the travel grooves 71, 72 and makes sure that when rotated along with the sleeve 6, the engaging member 62 will not jump away and suffer a concentrated force. Therefore, the reel unit 3 is kept in a stable state. Even if the fishing line exerts a drawing force onto the reel unit 3 during winding, the force is shared by the sleeve 6. Therefore, the reel unit 3 is stably located without swinging due to insufficient supporting force.

In addition, when used with a longer reel 31, the travel grooves 71, 72 of the mandrel 7 can be elongated to enlarge the up and down reciprocating travel and easily change the reciprocating travel of the reel 31. The sleeve 6 is fitted with the mandrel 7 and the reel unit 3 will not swing due to enlarged travel. Therefore, the present invention is applicable to a large-sized winder having large reciprocating travel of reel 31 without enlarging the volume of the housing 2.

In conclusion, the sleeve 6 of the linking mechanism 4 is fitted with the mandrel 7 drivingly connected with the reel 31. The engaging member 62 of the sleeve 6 is reciprocally movable within the travel grooves 71, 72 of the mandrel 7. The entire sleeve 6 can share the force exerted onto the mandrel 7 so as to ensure the engagement between the engaging member 62 of the sleeve 6 and the travel grooves 71, 72. Therefore, the engaging member 62 is guided by the sleeve 6 to smoothly move and make the fishing line evenly wound on the reel unit 3. In addition, the winder of fishing rod of the present invention can easily change the reciprocating travel of the reel 31.

The above embodiment is only used to illustrate the present invention, not intended to limit the scope thereof. Many modifications of the above embodiment can be made without departing from the spirit of the present invention.

What is claimed is:

1. A winder of a fishing rod, comprising:

a housing having an upward opening, the housing having a grip on one side for a user to hold, a bearing seat being disposed on a top section of the housing, the bearing seat being formed with a central axial hole in which a bearing is positioned, two sides of the bearing seat being respectively formed with two transverse holes;

a reel unit having a reel; and a linking mechanism disposed in the housing and including a crank and a mandrel, the crank being coupled with a gear, the mandrel being passed through the axial hole of the bearing seat, an outer circumference of the mandrel being formed with first and second travel grooves which are interlaced with each other in reverse directions, top and bottom ends of the first and second travel grooves communicating with each other, the top section of the mandrel being fitted with the reel, said winder being characterized in that the linking mechanism further includes a sleeve having a spiral rod section engaged with the gear, a middle section of the sleeve being formed with a hole, an engaging member being positioned in spring biased manner in the hole within the bearing of the bearing seat, a bolt section being formed at a top end of the sleeve for fixing a line winding rack, the mandrel being fitted in the sleeve and passed through the line winding rack, a projection of the engaging member being engaged in the first and second travel grooves of the mandrel, the reel of the reel unit being driven by the mandrel to reciprocally move up and down, when rotating the crank, the reel unit being simultaneously drivingly rotated and reciprocally moved up and down.

2. The winder of a fishing rod as claimed in claim 1, wherein one end of the crank is disposed with a hexagonal shaft and the gear is disposed at a middle section of a gear member, the gear member having a hexagonal hole in which the hexagonal shaft of the crank is inserted, two ends of the gear member being fitted with two bearings and extending through the transverse holes of the bearing seat.

3. The winder of a fishing rod as claimed in claim 1, wherein a cover body is disposed at a top section of the reel unit and bolted with the top end of the mandrel.

4. A winder of a fishing rod comprising:

a housing having an upward opening, the housing having a grip on one side for a user to hold, a bearing seat being disposed on a top section of the housing, the bearing seat being formed with a central axial hole in which a bearing is positioned, two sides of the bearing seat being respectively formed with two transverse holes;

a reel unit having a reel; and a linking mechanism disposed in the housing and including a crank and a mandrel, the crank being coupled with a gear, the mandrel being passed through the axial hole of the bearing seat, an outer circumference of the mandrel being formed with first and second travel grooves which are interlaced with each other in reverse directions, top and bottom ends of the first and second travel grooves communicating with each other, the top section of the mandrel being fitted with the reel, said winder being characterized in that the linking mechanism further includes a sleeve having a spiral rod section engaged with the gear, a middle section of the sleeve being formed with a hole, the hole of the sleeve being elliptic, an engaging member being positioned in the hole within the bearing of the bearing seat, a spring being disposed under the engaging member, a bolt section being formed at a top end of the sleeve for fixing a line winding rack, the mandrel being fitted in the sleeve and passed through the line winding rack, a projection of the engaging member being engaged in the first and second travel grooves of the mandrel, the reel of the reel unit being driven by the mandrel to reciprocally move up and down, when rotating the crank, the reel unit being simultaneously drivingly rotated and reciprocally moved up and down.

* * * * *